Aug. 10, 1965    S. GOLDFARB ETAL    3,200,395
SHAFT DIGITAL POSITION ENCODER
Filed June 19, 1961    4 Sheets-Sheet 1

SAMUEL GOLDFARB
JOSEPH J. BIRO
INVENTORS

BY S. A. Giarratana
George B. Augero
ATTORNEYS

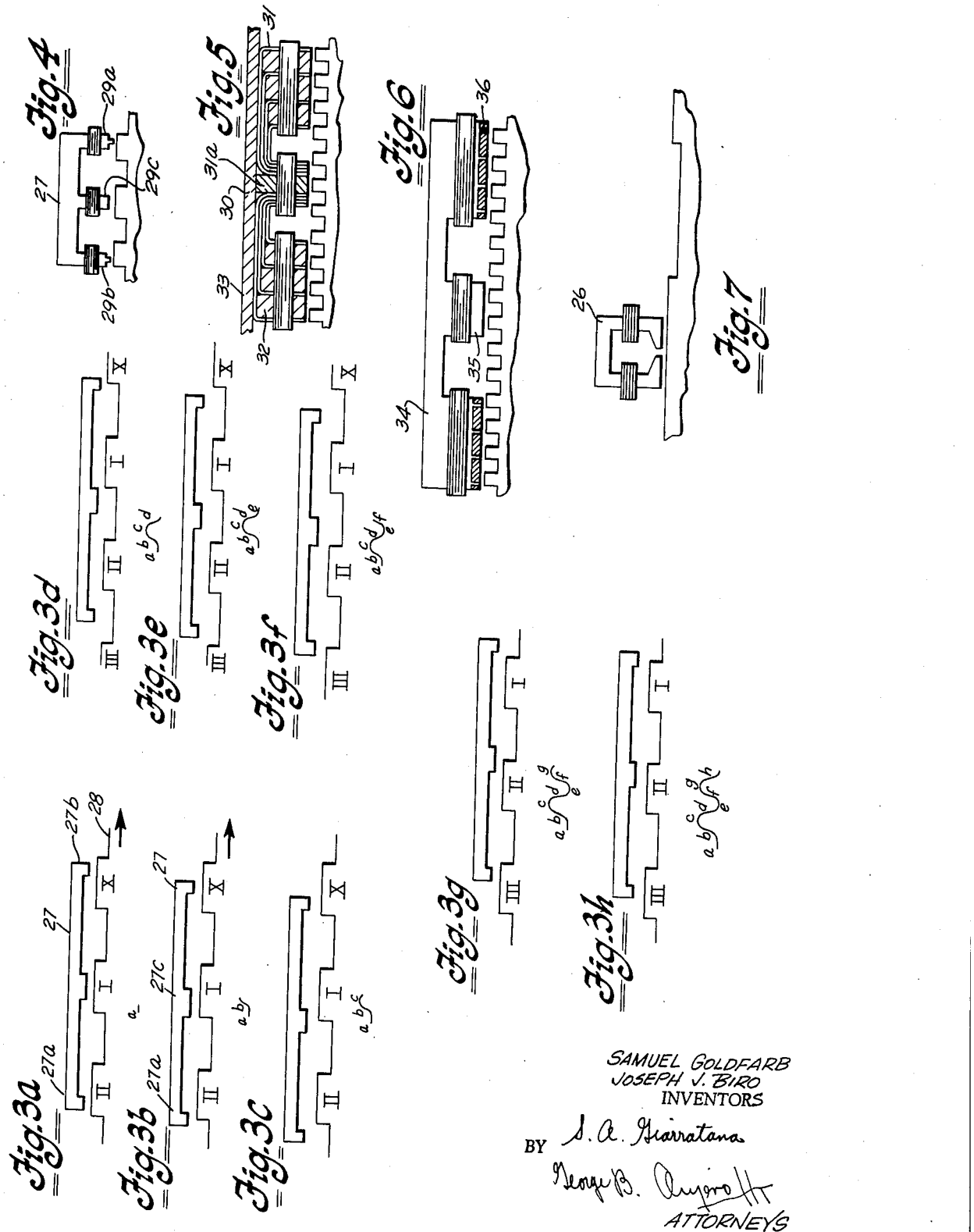

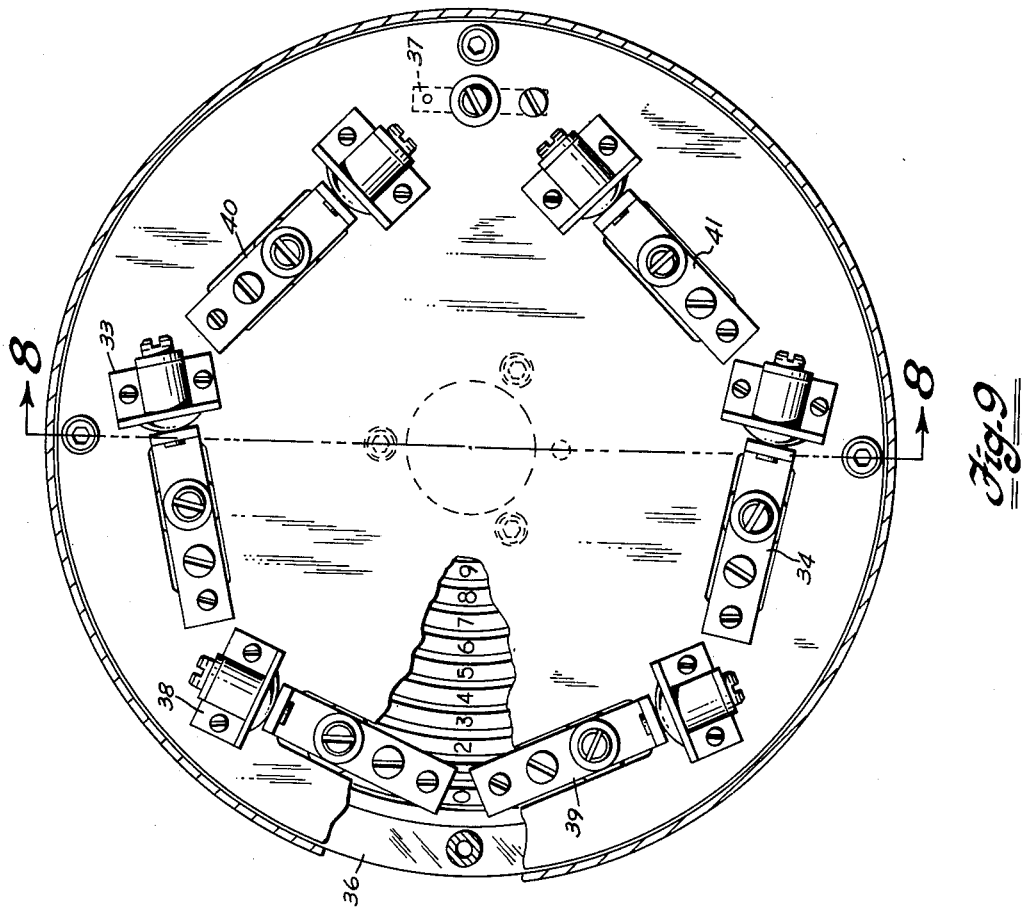
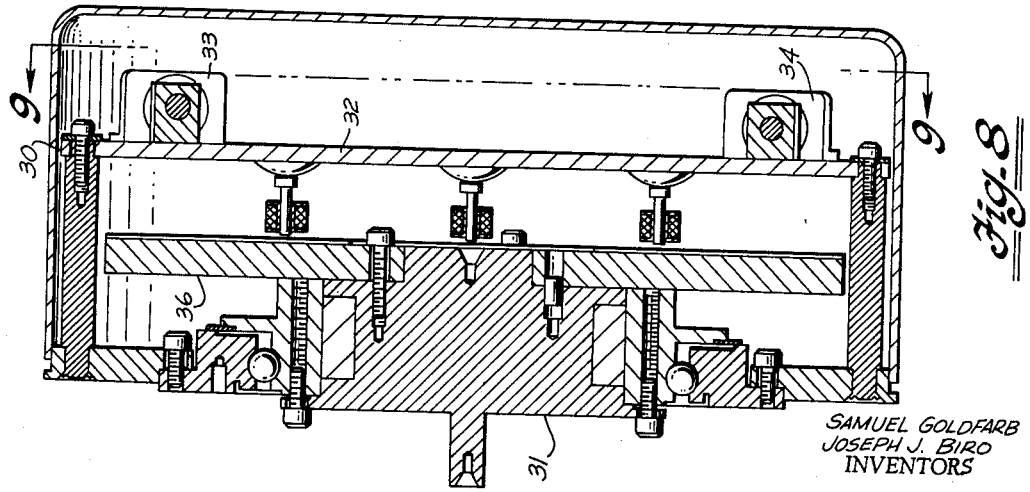

Aug. 10, 1965
S. GOLDFARB ETAL
3,200,395
SHAFT DIGITAL POSITION ENCODER
Filed June 19, 1961
4 Sheets-Sheet 4
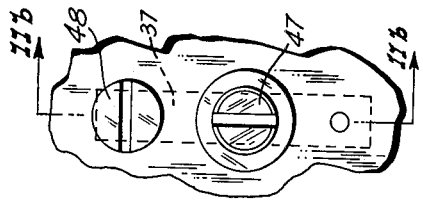
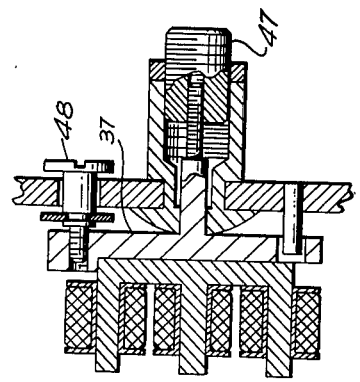
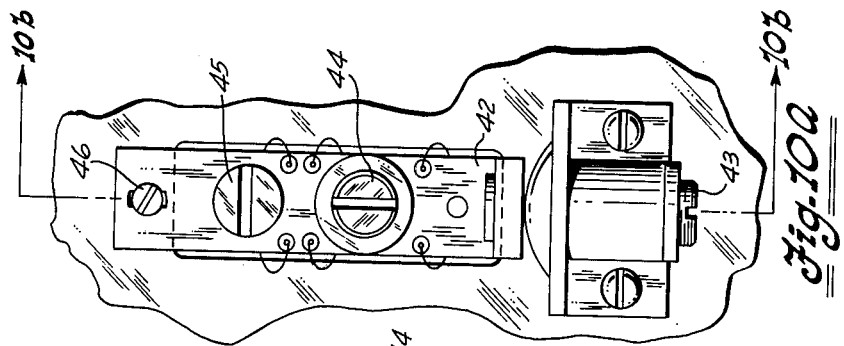
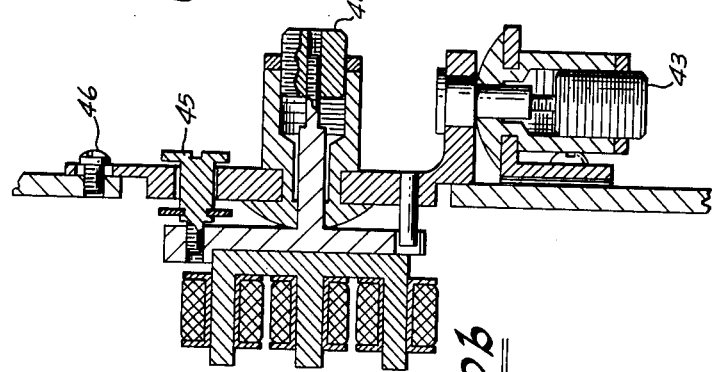
SAMUEL GOLDFARB
JOSEPH J. BIRO
INVENTORS
BY *S. A. Giannatona*
*George B. Anjoff*
ATTORNEYS

United States Patent Office 3,200,395
Patented Aug. 10, 1965

3,200,395
SHAFT DIGITAL POSITION ENCODER
Samuel Goldfarb, Morristown, and Joseph J. Biro, North Haledon, N.J., assignors to General Precision, Inc., Little Falls, N.J., a corporation of Delaware
Filed June 19, 1961, Ser. No. 118,114
5 Claims. (Cl. 340—347)

The present invention relates to a device for obtaining a digital representation of an angular rotation, and more particularly to an E-bridge arrangement for providing a digital representation of an angular rotation or position.

Existing digital position encoders can be divided into two types according to whether successive increments of position are distinguishable from each other. In incremental pattern devices, the output is the same for each quantized position. A counter is required to provide the position or total motion. The second type or coded pattern devices are directly analogous to a scale or ruler, in that each position has its own code or number. The present invention falls into this latter category. Existing encoders of this type use information stored in a commutator, optical mask, or magnetic structure. Readout is obtained by brushes, photocells and induction coils. Each type of encoder has certain physical limitations which affect its usefulness. Thus, the resolution of commutator encoders is limited by the contact area of its brushes. Encoder life is affected by brush wear. Brush life of commutators can be extended beyond 1000 hours by making the brushes retractable. This however is at considerable expense. Optical encoders of course have no brush contact and can provide a very high resolution. However, they are often limited by the photocell read-out means. The principal application for optical encoders are in high-resolution systems where their relatively delicate construction will not be subjected to jarring, impact shock or vibration. The most serious limitation on this type of device is the havoc which dust in the device can play. Small bits of dust resting on a code disc will completely throw off a device which must then be opened and carefully cleaned. There are at present several forms of magnetic pattern devices which use pole shapes and magnetized areas of homogenous magnetic medium. Read-out devices include square-loop toroids and variable coupling transformers. In magnetic encoders which use toroid read-out, bit width is limited by the size of the toroid—about 0.1 inch in diameter by 0.02 inch in length. However, heretofore, magnetic type of encoders have not succeeded in replacing optical encoders for most purposes. Although considerably more rugged with longer life in the read-out, the high resolution obtainable in optical devices is not attained in a magnetic device.

It has now been discovered that a rugged, reliable, non-contacting low impedance magnetic device can be provided with a fairly high resolution which can take the place of the optical devices in many cases, with none of the defects accompanying the delicate features of these devices.

Thus, it is an object of the present invention to provide an analog to digital converter.

Another object of the present invention is to provide a magnetic analog to digital converter.

Still another object of the present invention is to provide a magnetic analog to digital converter having a high order of resolution which is fairly rugged.

Yet another object of the present invention is to provide a shaft position to digital readout which has a small possibility of ambiguity in the readout and can provide a plurality of readouts.

Generally speaking the present invention contemplates an improvement in an apparatus for representing the angular position of a shaft as a digital quantity and comprises a code disc mounted for rotation by said shaft, said disc having thereon a plurlity of circular tracks concentrically disposed on said disc, each track being divided into alternately magnetic and non-magnetic segments of equal effective length, the number of segments doubling on each succeeding outward track. A mounting plate is disposed in a plane parallel to and in close proximity to said disc. At least one E-bridge pick-off having a center and outer poles is mounted on said mounting plate over the outermost track, the spacing between E-bridge poles being such that when the E-bridge center pole is centered over any one segment, the outer poles are each disposed three-quarters the distance over the length of a segment away from said one segment; and, a pair of E-bridge pick-offs including a center and outer poles on a plurality of said tracks inwardly adjacent said outermost track, the center pole of one of each of said pairs leading said one E-bridge center pole and the center pole of the other of each of said pairs lagging said one E-bridge center pole, said outer poles on each of said E-bridge pairs being similarly spaced three-quarters over the length of a segment away from a segment on which said center pole may be centered. For the innermost tracks, "C" pick-offs are used. Both the E-bridge pick-offs and the "C" pick-offs are used on the changeover track from E-bridge to the "C" pick-offs. As will be explained hereinafter, the foregoing arrangement increases the binary resolution normally obtainable by one power of two.

With the foregoing objects and brief description in view, the invention resides in the novel arrangements and combinations thereof hereinafter described, it being understood that changes in the precise embodiment of the invention herein disclosed may be made within the scope of what is described without departing from the spirit of the invention. The invention as well as other objects and advantages will become more apparent from the following description taken in conjunction with the accompanying drawing in which.

FIGURES 3a to 3h provide a graphic and schematic explanation for the extra binary resolution obtained using using the code disc and pick-off means herein described;

FIGURE 4 shows schematically one of the contemplated pick-off means utilized herein for intermediate digits;

FIGURE 5 depicts schematically one type of contemplated pick-off means utilized herein for some of the least significant digits;

FIGURE 6 illustrates schematically another type of pick-off utilized herein for some of the least significant digits;

FIGURE 7 shows schematically a type of pick-off means utilized herein for some of the most significant digits;

FIGURE 8 is a cross-sectional view of the code disc and pick-off contemplated herein;

FIGURE 9 is a rear view of the pick-off means assembly contemplated herein schematically superimposed over a portion of the face of the code disc contemplated herein without mounting means on which the pick-off means are mounted to facilitate the understanding of invention;

FIGURE 10a is a top view of one of the pick-off means assembly shown in FIGURE 9;

FIGURE 10b is a longitudinal cross-sectional view of the pick-off means assembly shown in FIGURE 10a;

FIGURE 11a is a top view of another of the pick-off means assembly shown in FIGURE 9; and, FIGURE 11b is a longitudinal cross-sectional view of the pick-off means assembly shown in FIGURE 11a.

Figure 2:
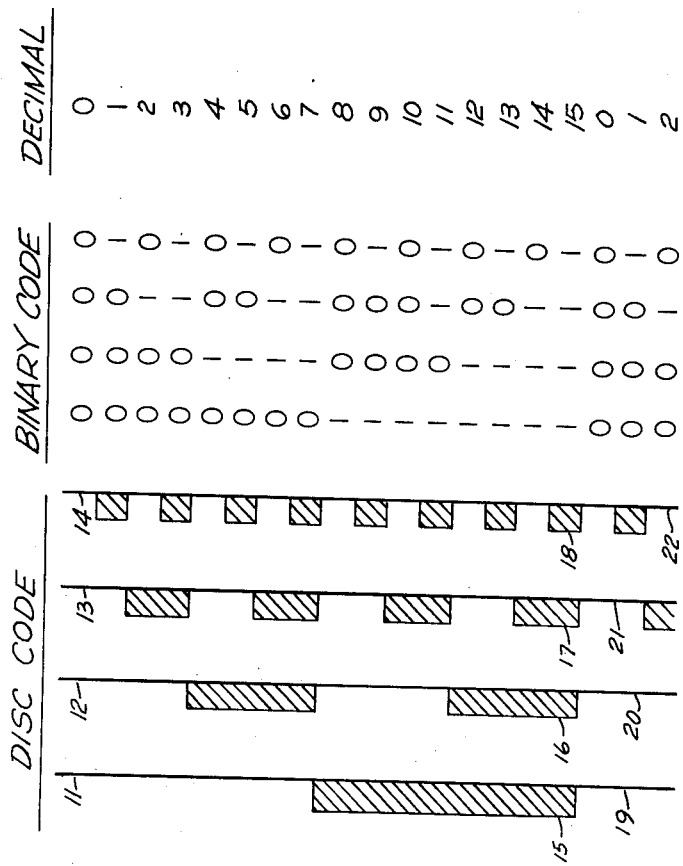
FIGURE 2 is a schematic view of the code contained on the code disc of FIG. 1, the corresponding decimal and binary values likewise being given.
Figure 1:
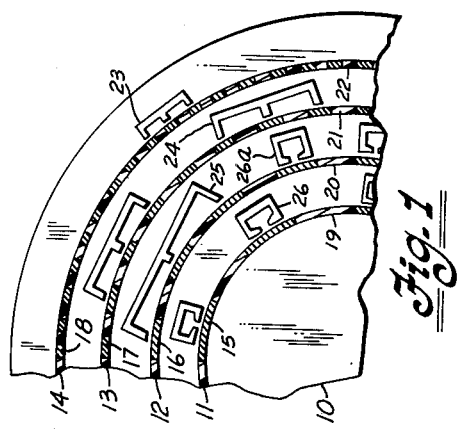
FIGURE 1 is a schematic view of a code disc and angular position pick-off means contemplated herein.

Looking first at FIGURE 1, there is shown a schematic representation of a portion of a code disc 10 contemplated herein. Code disc 10 has a plurality of concentric magnetic tracks which starting from the center of the disc are numbered 11, 12, 13 and 14. These tracks all have a plurality of linked magnetic segments 15, 16, 17, and 18 as well as a plurality of non-magnetic segments 19, 20, 21, and 22 interposed over the linking of the magnetic segments. An enlargement of the disc code is shown in FIGURE 2. Outer track 14 has the least significant code digits and has the smallest segments, the magnetic segments 18 being of an effective length equal to that of the non-magnetic segments 22. The next track 13 segment covers twice the angle subtended by the outer track and thus has the next to the least significant digit. The third track from the circumference, track 12 has segments which subtend twice the angle of the track 13 segments and four times the angle of that of the track 14 segments. Inner track 11 has segments twice the angle of that of track 12, and this would continue down towards the center of the disc. For the purpose of the present explanation, the number of tracks will be limited to four. In practice, a much higher resolution is possible and an explanation of how this resolution is attained will likewise be given herein, but in order to understand how a high resolution is attainable, it is first necessary to understand the operation of the coarse device of FIGURE 1, having thereon the code shown in FIGURE 2. Once the principles of operation of the coarse device are understood, the application of the fundamental principles to the device used in actual practice will be clearer.

Looking now at FIGURE 2, reading downwards, it is readily apparent that a readout can be obtained providing angular positions with the code extending completely around the circle.

It will be noted in FIGURE 1 that the readout of each track is by means of an E-bridge pick-off. The outer track 14 has the smallest E-bridge 23, first inner track 13 has a larger E-bridge 24, next inner track 12 has a still larger E-bridge 25 as well as a "C" pick-off 26a whereas innermost track 11 has only a "C" pick-off 26. For the moment, let us disregard innermost track 11 with its "C" pick-off 26 and let us look at FIGURES 3a to 3h. As can readily be seen there is a track 28 passing under an E-bridge pick-off 27. Track 28 might be any of the tracks shown in FIGURE 1 having an E-bridge pick-off. As will be seen in FIGURE 3a, at the zero position, the middle pole of the E-bridge is centered over magnetic segment I and the outer poles 27a and 27b of the E-bridge extend over the two magnetic segments adjacent to arc I, namely over arc II and arc X. The critical feature of the disposition of the E-bridge is that the two outer poles extend precisely to cover an area on said adjacent magnetic arcs X and II which is three-quarters the length of the arc, with arc I as the center and measuring from the point on the respective arcs nearest to arc I, the central arc. Thus, pole 27a is three-quarters over arc II away from arc I, and pole 27b is three-quarters over arc X, away from arc I. As is readily apparent, with the center pole 27c of E-bridge 27 centered over arc I, and outer poles 27a and 27b each being respectively disposed over arcs II and X at a distance three-quarters the length of the arc away from arc I, the signal from the E-bridge is a zero as indicated by the small schematic line "a" below center 27c of the E-bridge. Moving now to FIGURE 3b, arc I has moved over one quarter arc, outer pole 27a has begun to leave the magnetic arc II but center pole 27c and outer pole 27b are still over magnetic arcs I and X. A signal shown schematically as line "b" is produced by the E-bridge (for convenience the previous signal "a" is also shown). Moving in the direction of the arrow to FIGS. 3c through 3h, the signal produced is respectively indicated by the letters c through h and for convenience, the previous signal is also repeated. When E-bridge center pole 27c has traveled from magnetic arc I over to magnetic arc II, i.e., one space, as shown in FIGURE 3h, there are two positive and two negative peaks to the signal. Thus, by traveling one magnetic and one non-magnetic interval, track 28 has caused E-bridge 27 to give off two positive and two negative signals. It follows therefore that from the foregoing arrangement, an additional binary resolution has been added to least significant digit. E-bridge 27 is made of E-shaped transformer laminations or ferrite with windings on the three legs as shown in FIGURE 4. Normally, the center coil 29c is excited by A.-C. voltage, and the two outer coils 29a and 29b are connected so that the induced voltages cancel when equal coupling exists. To produce encoder read-out, the cores are sized and phased with respect to the shaped ferromagnetic rotor as shown in the drawing. The air-gap charges produced by rotation causes variance in coupling, becoming less in one coil and greater in the other; and, after passing through a period of equal coupling, the process is reversed. As shown in FIGS. 3a to 3h, there are two alternations of coupling for each alternation shaped on the rotor. Thus, there is produced an additional power of two in the output. At first glance it would seem that the limitation in resolution is determined by the magnetic segment size. The arrangement illustrated in FIGS. 1 and 3a to 3h is satisfactory for intermediate digits, but the pole length becomes impractically small for the less significant digits. To retain the necessary magnetic cross section, a multiple pole parallel E-bridge construction such as that shown in FIGURES 5 and 6 is used.

The design shown in FIGURE 5 indicates the construction of a parallel E-bridge assembly 30 using foil magnetic material 31 separated by non-magnetic spacers 32. The parallel E-bridge assembly 30 is held together by a plate 33. The center poles are disposed on both sides of a magnetic spacer 31a; variations in pole spacing required for successive tracks necessitates a different arrangement for each track. The design of FIGURE 6 shows E-bridge cores formed by machining to produce solid E-bridge block 34 and photo-etching the face 35 to form the E-bridge poles 36. With this parallel design, one basic block may be used for several tracks and the etch pattern is altered. The construction shown in FIGURE 6 requires use of the roll-off technique in order to provide maximum etching depth. This process requires successive etching with heavy consistency etch-resist rolled on the surface of the disc. The resist is viscous enough to cover the surface and roll down the edge of the etched hole without covering the bottom. This process maintains perpendicularity between the etched edge and the surface of the disc and permits deep etching.

The binary code with which the pick-offs are used in this application is subject to error from imperfect alignment. To avoid the errors which would otherwise appear, the parallel arrangement may advantageously be used. This arrangement furnishes not one, but a plurality of readings for each track. To further prevent errors, a V-scan pick-off is provided. The V-scan pick-off also reduces manufacturing tolerances on pick-off alignment and on the code disc. It does, however, double the number of pick-offs, and requires external logic circuitry. The external logic circuits are needed to determine whether lagging or leading pick-offs are to be used. In this method, one pick-off is located on the least significant track and two pick-offs (leading and lagging) are located symmetrically about the index line for each additional track. The pick-off on the least significant track determines the index. An explanation of V-scan read-out will be found in the J. W. Gray, U.S. Patent No. 2,866,184 owned by General Precision, Inc.

To maintain the desired relation between E-core poles and rotor segments, the E-cores get larger for the more significant tracks. At some four or five tracks from the least significant digit, the E-bridge pick-off is fairly long and the rotor segments are large enough to permit using the "C" pick-off shown in FIGURE 7. The "C" pick-off produces an output with a one-to-one relation to the rotor segment. Therefore on the "E" to "C" change-over track, two "C" pick-offs and two E-bridge pick-offs are used. The "C" pick-offs provide the nth from the most significant digit and the E-bridge pick-offs provide the nth plus one from the most significant digit. Only two "C" pick-offs are provided on the more significant tracks.

The choice of excitation frequency should be made on the basis of one-third the expected natural frequency due to parasitic capacity resonating with coil inductance. If the actual resonant frequency is lower than 60 kc., it is advantageous to choose a higher operating frequency because output voltage increases proportionately. Operation at or near the resonant frequency should theoretically result in increased output, but in practice the output is subject to variations due to frequency drift of the excitation source.

In carrying the invention into practice, it must be remembered that certain adjustments may be necessary after the device has been assembled. FIGURE 8 shows a cross-sectional view of a device contemplated. The gap between the coded disc and the E-bridges is about 0.0005 inch. The device has a housing 30 supporting a shaft hub 31 mounting means not shown. Code disc 36 rotates on shaft hub 31 utilizing bearings and races. Opposed to the code disc 36 is the readout assembly mounting plate 32 having mounted thereon E-bridges 33 and 34. The disposition of the E-bridge for a few of the tracks is shown in FIGURE 9. Here there is illustrated a code disc 36 having tracks "0," "1," "2," "3," "4," "5," "6," "7," "8," "9." E-bridge pick-off assembly 37 located on the "0" track determines the index line. At the opposite end of the disc, on both sides of the index line are pick-off assemblies 38 and 39 on track "1." Next are pick-off assemblies 34 and 33 on track "2" and finally, pick-off assemblies 40 and 41 on track "3." As shown in FIGURE 10, each E-bridge assembly on the intermediate tracks has a housing 42, a longitudinal differential adjustment screw 43 and an E-bridge height differential adjustment screw 44 at right angles to the plane of the longitudinal adjustment screw 43. Further adjustment may be provided by additional adjustment screws 45 and 46. For the E-bridge assembly on the least significant track, i.e., E-bridge assembly 37 a single height adjustment screw 47 may suffice. Although an additional adjustment screw 48 for dual adjustment may be provided. The adjustment of the "C" pick-off by mechanical adjusting means is no particular problem.

As the gap between the pick-offs and the code disc may be of the order of 0.0005 inch, it may also be desirable to place the pick-off means mounting plate 32 together with the mounted pick-offs on a lapping machine to complete the adjustment.

In constructing the device, attention may have to be given to the fringing effect. When passing over magnetic and non-magnetic segments of equal length, exact mirror image signals are not produced. Furthermore if the segments are exactly rectangular, a square wave signal is not produced. This phenomenon is known as fringing effects. Fringing effects are caused by minute irregularities in the cores, stray capacitance etc. Rather than carefully analyzing the causes thereof, to correct fringing, it is simpler to proceed by trial and error. For this reason the magnetic and non-magnetic segments are described as being of "effectively equal lengths" and by this expression what is meant is that an adjustment has been made in the geometric configuration of the segments to account for the fringing effect. It is to be observed therefore that the present invention provides for an improvement in an apparatus for representing the angular position of a shaft as a digital quantity and comprises a code disc 36 having thereon a plurality of circular tracks concentrically disposed on said disc, each track being divided into alternately magnetic and non-magnetic segments of effectively equal length, the number of segments doubling on each succeeding outward track, mounting plate 32 disposed in a plane parallel to and in close proximity to said disc, at least one E-bridge pick-off 37 having a center and outer poles mounted over the outermost track, the spacing between E-bridge poles being such that when the E-bridge center pole is centered over one segment, the outer poles are each disposed three-quarters the distance over the length of a segment away from said one segment; pairs of E-bridge pick-offs 33, 34, 38, 39 including a center and outer poles over a plurality of said tracks inwardly adjacent said outermost track, the center pole of one of each of said pairs leading said one E-bridge center pole and the other center pole of each of said pairs lagging said one E-bridge center pole, said outer poles on each of said E-bridge pairs being similarly spaced three-quarters over the length of a segment away from a segment on which said center pole may be centered. The leading and lagging arrangement of the "C" and E-bridge pick-offs provides the V-scan readout, so as to avoid errors in imperfect alignment. If the segment size of the outer tracks is very small, a parallel E-bridge assembly 30 is used on these tracks. Also, the parallel E-bridge arrangement may comprise a solid block 34 having photoetched poles 36, "C" pick-offs are used over the innermost track having large segments and both the E-bridge and "C" pick-off arrangement must be used on the track where the E-bridge to "C" pick-off changeover takes place.

It will be apparent to those skilled in the art, that our present invention is not limited to the specific details described above and shown in the drawings, and that various modifications are possible in carrying out the features of the invention and the operation and the method of support, mounting and utilization thereof, without departing from the spirit and scope of the appended claims.

We claim:

1. In an apparatus for representing the angular position of a shaft as a digital quantity, the improvement therein comprising, a code disc mounted for rotation by a shaft, said disc having thereon a plurality of circular tracks concentrically disposed on said disc, each track being divided into alternately magnetic and non-magnetic segments of equal effective length, the number of segments doubling on each succeeding outward track;

a mounting plate disposed in a plane parallel to and in close proximity to said disc;

at least one E-bridge pick-off having a center and outer poles mounted on said mounting plate over the outermost track, the spacing between E-bridge poles being such that when the E-bridge center pole is centered over one segment the outer poles are each disposed three-quarters the distance over the length of a segment away from said one segment; and, a pair of E-bridge pick-offs including a center and outer poles mounted on said mounting plate over a plurality of said tracks inwardly adjacent said outermost track, the center pole of one of each of said pairs leading said one E-bridge center pole and the other center pole of each of said pairs lagging said one E-bridge center pole, said outer poles on each of said E-bridge pairs being similarly spaced three-quarters over the length of a segment away from a segment on which said center pole may be centered.

2. In an apparatus for representing the angular position of a shaft as a digital quantity, the improvement therein comprising.

a code disc mounted for rotation by a shaft, said disc having thereon a plurality of circular tracks concentrically disposed on said disc, each track being divided into alternately magnetic and non-magnetic segments of equal effective length, the number of segments doubling on each succeeding outward track;

a mounting plate disposed in a plane parallel to and in close proximity to said disc;

at least one E-bridge pick-off having a center and outer poles mounted on said mounting plate over the outermost track, the spacing between E-bridge poles being such that when the E-bridge center pole is centered over one segment the outer poles are each disposed three-quarters the distance over the length of a segment away from said one segment;

a pair of E-bridge pick-offs including a center and outer poles mounted on said mounting plate over a plurality of tracks inwardly adjacent said outermost track, the center pole of one of each of said pairs leading said one E-bridge center pole and the other center pole of each of said pairs lagging said one E-bridge center pole, said outer poles on each of said E-bridge pairs being similarly spaced three quarters over the length of a segment away from a segment on which said center pole may be centered;

a pair of "C" pick-offs having two poles mounted on said mounting plate over on the innermost tracks, the two poles of one of said "C" pick-offs leading, and, the two poles of the other of said "C" pick-offs lagging said one E-bridge center pole; and, a pair of both E-bridge pick-offs and "C" pick-offs mounted on said mounting plate over the track where the E-bridge pick-offs change to "C" bridge pick-offs, the respective poles of each of said pick-offs leading or lagging said one E-bridge center pole as previously described in this claim.

3. In an apparatus for representing the angular position of a shaft as a digital quantity, the improvement therein comprising, a code disc mounted for rotation by a shaft, said disc having thereon a plurality of circular tracks concentrically disposed on said disc, each track being divided into alternately magnetic and non-magnetic segments of equal effective length, the number of segments doubling on each succeeding outward track;

a mounting plate disposed in a plane parallel to and in close proximity to said disc;

a parallel E-bridge assembly mounted on said mounting plate over said outermost track having a plurality of foil magnetic material outer poles and center poles said outer poles being separated by a non-magnetic spacer, said center poles being disposed on both sides of a magnetic spacer, the spacing between each outer pole and the center poles being such that when the E-bridge center poles are all centered over one segment, each outer pole is disposed three quarters the distance over the length of a segment; and, a pair of parallel E-bridge assemblies mounted on said mounting plate over a plurality of tracks inwardly adjacent said outermost track, having foil magnetic material outer and center poles separated by non-magnetic and magnetic spacers like said parallel E-bridge assembly mounted over said outermost track, the center poles of one of said pair leading the center poles of said outermost track center poles, the center poles of the other of said pair lagging the center poles of said outermost track, the outer poles of each of said pair being disposed three quarters the distance over the length of a segment away from a segment on which the respective center poles of said pair may be centered.

4. In an apparatus for representing the angular position of a shaft as a digital quantity, the improvement therein comprising, a code disc mounted for rotation by a shaft, said disc having thereon a plurality of circular tracks concentrically disposed on said disc, each track being divided into alternately magnetic and non-magnetic segments of equal effective length, the number of segments doubling on each succeeding outward track;

a mounting plate disposed in a plane parallel to and in close proximity to said disc; and, a solid E-bridge block mounted on said mounting means over a plurality of tracks, having at least one set of parallel E-bridge cores of outer poles and a center pole disposed over said outermost track and pairs of parallel E-bridge cores of outer poles and a center pole disposed over a plurality of tracks inwardly adjacent said outermost track, the spacing between outer poles and the respective center poles for each E-bridge being such that when any E-bridge core center pole is centered over any segment, the outer poles of the E-bridge core corresponding to said center pole are each disposed three quarters the distance over the length of a segment away from said segment on which said center pole is centered, one of said pairs of E-bridge core center poles on each track leading the center pole of said outermost track, and the other of said pair of E-bridge core center poles lagging the center pole of said outermost track.

5. In an apparatus as claimed in claim 4, a pair of "C" pick-offs having two poles mounted on said mounting plate over the innermost tracks, the two poles of one of said "C" pick-offs leading, and the two poles of the other of said "C" pick-offs lagging said center pole of said E-bridge cores disposed over said outermost track and, a pair of "C" pick-offs mounted on said mounting plate over the innermost track covered by said parallel E-bridge cores forming part of said solid block.

References Cited by the Examiner

UNITED STATES PATENTS

| | | | |
|---|---|---|---|
| 2,794,851 | 6/57 | Morris | 340—347 |
| 2,909,717 | 10/59 | Hulls et al. | 340—347 |
| 3,038,345 | 6/62 | Hoeppner et al. | 340—347 |

MALCOLM A. MORRISON, *Primary Examiner.*